United States Patent [19]

Vassilev et al.

[11] 3,979,269

[45] Sept. 7, 1976

[54] METHOD FOR OBTAINING TETRACYCLINEHYDROCHLORIDE

[75] Inventors: Hristo Dimitrov Vassilev; Simeon Assenov Zahariev; Danail Yovchev Donev, all of Razgrad, Bulgaria

[73] Assignee: DSO "Pharmachim, Bulgaria

[22] Filed: Feb. 25, 1975

[21] Appl. No.: 553,043

[52] U.S. Cl. ............................................. 204/158 S
[51] Int. Cl.² ............................................. B01J 1/12
[58] Field of Search ........................ 204/158 S, 193

[56] References Cited
UNITED STATES PATENTS 3,833,491    9/1974    Kennedy ........................ 204/158 S Primary Examiner—Howard S. Williams
Attorney, Agent, or Firm—Ladas, Parry, Von Gehr, Goldsmith & Deschamps

[57] ABSTRACT

This invention provides method for obtaining tetracycline hydrochloride through interaction of a suspension consisting of tetracycline base in an organic solvent with concentrated hydrochloric acid, wherein the solution containing tetracycline base and hydrochloric acid is treated by high-frequency oscillations.

4 Claims, No Drawings

METHOD FOR OBTAINING TETRACYCLINEHYDROCHLORIDE

The present invention relates to a method for obtaining tetracycline hydrochloride.

It is known that tetracycline hydrochloride can be obtained through the suspension of a tetracycline base in an organic solvent followed by interaction with concentrated hydrochloric acid, using mainly various alcohols as solvents.

The tetracycline concentrations should be 90,000 to 300,000u/ml. The hydrochloric acid is of 36–38% concentration, its specific gravity is above 1.18 and an excess of 15–40% of the equivalent is added, which means 210–270ml acid to 1 billion u.

After adding the above quantity of concentrated hydrochloric acid a solution is obtained which is filtered and the filtrate is then stirred for 2.5 to 3 hours at 42° – 45°C., whereafter tetracycline hydrochloride crystallizes out.

After tempering the mixture the crystals are being filtered, washed and dried. It is a disadvantage of this method that the final product has a yellowish color, turning easily into reddish brown with the time. The crystallization takes no less than 2½ hours and goes on till the mother liquor activity falls down below a definite value. The crystal form conglomerates, which makes it easy to include molecules of the solvent, as well as, of the acid, which later lend smell and reddish color to the substance. The yield is 78–82%. It is also known that biologically active substances, for instance amino acids and other natural products, are treated by high frequency oscillation with the aim of speeding up certain processes. It is of a disadvantage to this method that biologically active substances suffer break-down and lose their activity to a high degree.

It is a purpose of the invention to work out a method for obtaining tetracycline hydrochloride, avoiding the disadvantages of the above known methods and providing a final substance of high quality, while at the same time cutting the time of the process down and increasing the output.

It has been found out that when treating solution of tetracycline and hydrochloric acid in excess of 15–40% with high-frequency oscillations the process of crystallization is considerably hastened, a cleaner final product is obtained and the output is increased. For this purpose, the concentrate obtained in the familiar manner is caused to pass at 35°–60°C, in a basin supplied with an oscillator emitting 10,000–400,000 oscillations per second with field intensity of 0.5–10.5 watt/cm$^2$.

Under these conditions on the third minute the beginning of spontaneous crystallization in the whole volume becomes perceptible. The crystals get small, micronized, which is very important when preparing unguents, syrups, and other medicines. This method of proceeding allows for no conglomerates and the substance formed has a homogeneous light-yellow color, unlike the control test which have not been treated by high-frequency oscillations. The mother liquor's activity lessening is in direct proportion to the time of the oscillation treatment, the values being by 2,000–4,000u/ml smaller than those of the control tests.

The crystallization temperature climbing above 60°C. shortens the time for oscillation but affects the color and the quality of the final product considerably.

The optimal temperature established experimentally is 35° to 60°C.

After oscillation treatment for 8 to 12 min., enough for complete crystallizaton, the suspension is drawn out. The process becomes more precise if a balanced flow crosses the high-frequency oscillation field. After this treatment the solution is filtered in order to separate the tetracycline hydrochloride crystals from the mother liquor.

The method according to the invention has the following advantages: the time for crystallization of the tetracycline hydrochloride is 10–18 times shorter, as compared with the previously known method. The tetracycline hydrochloride has micronized structure, without including solvent and acid, and its activity is considerably higher than the activity of the control tests, close to the theoretical activity. The product has a stable light-yellow color; the epimeric forms, the histamine content and all the other characteristics meet the requirement of British Pharmacopoeia/68, Pharm.-Chim. USSR and the international pharmacopoeia. The experiments show that the toxicity of the final product is especially low which makes it possible to produce medicines of much higher quality. The tetracycline thus obtained is especially apt for producing tetraolean(oletetrin).

The following examples embody the essence of the invention.

EXAMPLE 1

Bases of 30g with activity of 900u/ml is dissolved in 140 ml butanol, 10 ml ethanol, 7.3 ml. concentrated hydrochloric acid. After filtering the concentrate obtained is warmed to 37°C. and is put in a flow under the impact of high-frequency oscillations of 22,000 hz per 8 min. The crystals obtained are filtered, washed with butanol and then dried at 55°C. in vacuum. 24,550g tetracycline hydrochloride is obtained with 985u/mg activity. The output is 89.5%.

EXAMPLE 2

To 150g. base with 940u/mg activity 336 ml. butanol and 144 ml ethyl cellosove are added and after suspending the mixture well 31 ml concentrated hydrochloric acid is added.

The solution obtained is filtered and after warming it to 40°C., it undergoes ultrasonic treatment, of 30,000Hz for 4 minutes. Then it is filtered and washed with butanol. The crystals obtained are dried at 50°C. in vacuum, 125g tetracycline hydrochloride is obtained of 990u/mg activity. The yield is 87%.

What we claim is:

1. Method for obtaining tetracycline hydrochloride through interaction of a suspension consisting of tetracycline base in an organic solvent with concentrated hydrochloric acid, wherein the solution containing tetracycline base and hydrochloric acid is treated by high-frequency oscillations.

2. Method as claimed in claim 1, wherein high-frequency oscillation of 10,000–400,000Hz are used, while the field intensity is 0.5–10.5 watt/cm$^2$.

3. Method as in claim 2, wherein the tetracycline hydrochloride crystallizes at 35° to 60°C.

4. Method as in claim 1, wherein the tetracycline hydrochloride crystallizes at 35°–60°C.

* * * * *